US007228632B2

(12) United States Patent
Fedor et al.

(10) Patent No.: US 7,228,632 B2
(45) Date of Patent: Jun. 12, 2007

(54) CUTLERY IMPLEMENT

(75) Inventors: Scott Fedor, Perrysburg, OH (US); Paul Angelo Logiudice, Toledo, OH (US); Brian Demers, Rossford, OH (US); Ryan Williams, Toledo, OH (US)

(73) Assignee: Calphalon Corporation, Freeport, IL (US)

(*) Notice: Subject to any disclaimer, the term of this patent is extended or adjusted under 35 U.S.C. 154(b) by 698 days.

(21) Appl. No.: 10/158,197

(22) Filed: May 31, 2002

(65) Prior Publication Data

US 2003/0226263 A1 Dec. 11, 2003

(51) Int. Cl.
*B26B 3/00* (2006.01)
*A47J 43/28* (2006.01)

(52) U.S. Cl. ........................ 30/298.4; 30/147; 30/340; 81/DIG. 5

(58) Field of Classification Search ............... 30/298.4, 30/340, 147; 81/DIG. 5; D7/393, 649, 653, D7/664
See application file for complete search history.

(56) References Cited

U.S. PATENT DOCUMENTS

| | | | | |
|---|---|---|---|---|
| 336,314 | A | | 2/1886 | Hatfield |
| 348,330 | A | | 8/1886 | La Fave |
| 1,611,889 | A | | 12/1926 | Champlin |
| 1,989,225 | A | | 1/1935 | Campbell |
| D143,250 | S | | 12/1945 | Storm |
| D154,134 | S | | 6/1949 | McMillen |
| 2,615,247 | A | | 10/1952 | Waters |
| 2,651,839 | A | | 9/1953 | Folland |
| D193,496 | S | | 8/1962 | Jacoff |
| D195,951 | S | | 8/1963 | Wildgen |
| 3,122,774 | A | | 3/1964 | Lamb |
| D202,395 | S | | 9/1965 | Lamb |
| D302,092 | S | | 7/1989 | Cohen et al. |
| D303,748 | S | | 10/1989 | Yamagishi |
| D306,812 | S | | 3/1990 | Kawasaki |
| 4,947,713 | A | * | 8/1990 | Arnold ...................... 81/121.1 |
| 4,955,139 | A | | 9/1990 | Clotten et al. |
| 4,969,267 | A | | 11/1990 | Anenberg |
| 5,081,770 | A | * | 1/1992 | Fierthaler .................... 30/355 |
| D324,326 | S | | 3/1992 | Lu |

(Continued)

FOREIGN PATENT DOCUMENTS

DE 395485 2/1923

(Continued)

OTHER PUBLICATIONS

Miracle Blade, LLC., Miracle Blade III, 2002, www.miracleblade.com, 3 pages.*

(Continued)

*Primary Examiner*—Boyer D. Ashley
*Assistant Examiner*—Isaac N. Hamilton
(74) *Attorney, Agent, or Firm*—Foley & Lardner LLP

(57) ABSTRACT

A cutlery implement includes a blade, a tang and a handle. An insignia or making is located on an end surface of the handle facing away from the blade, the insignia indicating the type of blade attached to the handle. The blade and tang are part of a single piece of forged metal. The tang extends substantially the entire length of the handle and includes a surface visible from the top of the handle.

28 Claims, 6 Drawing Sheets

U.S. PATENT DOCUMENTS

| | | | | |
|---|---|---|---|---|
| 5,131,152 | A | 7/1992 | Wordtmann et al. | |
| 5,219,392 | A * | 6/1993 | Ruzicka et al. | 81/124.3 |
| 5,341,707 | A * | 8/1994 | Bond | 81/436 |
| 5,365,666 | A | 11/1994 | Gonzalez | |
| 5,402,578 | A | 4/1995 | Whitman et al. | |
| 5,528,834 | A | 6/1996 | Seber et al. | |
| D372,635 | S | 8/1996 | Gebhardt | |
| 5,791,055 | A | 8/1998 | Mangol | |
| D400,059 | S | 10/1998 | Cohen et al. | |
| 5,850,784 | A | 12/1998 | Conner | |
| D407,603 | S | 4/1999 | Cohen et al. | |
| D473,430 | S | 4/2003 | Fedor et al. | |
| 2001/0042309 | A1 | 11/2001 | Sanelli | |
| 2002/0023359 | A1 | 2/2002 | Peppel et al. | |

FOREIGN PATENT DOCUMENTS

| | | | |
|---|---|---|---|
| EP | 0 474 295 | A1 | 3/1992 |
| EP | 1 123 679 | A2 | 8/2001 |

OTHER PUBLICATIONS

Japanese Design Registration No. 243781, cited in the Japanese Patent Office Design Gazette published on Feb. 26, 1965.

Chefmate, 13 Piece Cutlery Block Packaging.

Guzzini, Knife Block Set.

J.A. Henckels, Five Star Knife.

Black Diamond Knife.

Chicago Cutlery, Premier Fine Edge Set.

Wusthof, Culinar Knife Set.

* cited by examiner

CUTLERY IMPLEMENT

BACKGROUND

The present invention is related to cutlery, including knives, forks, shears and other utensils used in preparing food. More particularly, the invention relates to cutlery with an ergonomic handle and a marking that identifies a particular cutlery implement when it is sheathed in a block. In some instances, cutlery is stored in a block of material, typically wood. A cutlery implement may include a working portion (e.g., the blade or prongs) that is stored in an opening or slot in the block allowing the handle of the cutlery implement to be exposed. This arrangement allows the cutlery to be stored in position ready for use and protects the working end of the implements.

When cutlery is stored in the block, the blade or prong is not exposed, and so, the user is not always able to determine readily the type of implement in the block. Often, the user will grasp and remove a piece of cutlery only to realize that the wrong piece of cutlery was selected. In some instances, the size of the handle is proportional to the size of the blade, and the size provides some visual indication of the type of implement. However, when the blades are close in length (e.g., six and eight inches) the difference in the handle size is not readily discernible. Furthermore, in some instances, different pieces of cutlery will have the identical handle (e.g., a fork and a knife of similar size). Constant removal of the knife from the block for inspection purposes creates unnecessary wear and tear on the knife blade.

One known cutlery set includes an icon on the blade of the knife indicating the type of food to be cut by the knife (e.g., poultry, vegetables etc.) and a corresponding icon located on the block. However, this identification method has several drawbacks because if a knife is repositioned incorrectly in the block then the icon on the block does not correctly identify the knife. Also, when the knife is stored or sheathed in the block the icon on the blade of the knife is not visible to the user. Thus, the user does not know whether the knife is the desired choice until the knife is removed from the block.

As a result, there is a need for cutlery that includes a mechanism for quickly and easily identifying the type of implement being stored in the block.

In addition to ease of use, consumers are mindful of the quality of cutlery, particularly with respect to knives. Fully forged cutlery, in which the working end (i.e., the blade or tongs) and the tang are constructed as a single forged piece, are considered to provide durability, strength, and balance. For example, a chef or cook who conducts sustained cutting or chopping operations typically prefers a piece of cutlery that is well balanced in order to minimize fatigue and promote easier control. Preferably, the weight of the cutlery should be evenly distributed between the implement and the handle. For this reason, fully forged cutlery often have tangs with exposed top length portions (i.e., uncovered by the grip material that forms the handle) so that consumers may see the one-piece construction of the working end and the tang.

Another feature important to the consumer is the "feel" of the handle. Cutlery handles are typically fabricated from a wide variety of natural and synthetic materials, or combinations of two or more materials. Resilient or pliable materials have been used as coverings for the rigid tang portion of the knife in order to provide a more comfortable, cushioned grip. Typically, an injection molded one-piece plastic or rubber handle is positioned onto the tang. Some cutlery utilizes a contoured handle that provides a more ergonomic shape for increased comfort. However, such ergonomic handles conventionally have grip material that covers the tang. As a result, the consumer cannot visually inspect the quality of the implement as with is possible implements having exposed tangs.

While contour-shaped, ergonomic handles are known in the art, such handles often are relatively thick and bulky, and do not provide for comfortable use by both consumers with small hands and consumers with large hands. Moreover, thicker, ergonomic handles often are not as comfortable when gripped between the thumb and forefinger over the bolster and the blade, as is typical for professional users.

Consequently, it is desirable to provide cutlery that have contoured, ergonomic shaped handles that are comfortable for both professional and ordinary consumers and for consumers with different sized hands. It is also desirable to provide such cutlery having an exposed tang that allows the user to inspect the quality and characteristics of the implements.

SUMMARY OF THE INVENTION

According to a first aspect of the present invention, a cutlery implement is provided. The implement includes a working element attached to a handle. An external marking is provided for indicating the type of working element attached to the handle. Preferably, the marking is located on an end of the handle facing away from a working element so that when the working element is sheathed the marking is displayed. The working element may comprise a knife blade.

According to another aspect of the invention, the implement may further include a tang extending from the blade along substantially the entire length of the handle, wherein the blade and the tang are one-piece of forged metal. The marking may be provided on an end cap connected to the end of the tang. The tang includes an externally visible surface extending along a top surface of the handle, which is indicative of the quality and characteristics of the implement, such as balance and durability.

According to still another aspect of the invention, the handle may be configured so that a top line extending along the top of the handle includes a single peak and a bottom line extending along the bottom of the handle is curved and includes a single valley. The end surface of the handle may be substantially planar and angled so that a line connecting the top line and the bottom line is angled so that the point where the bottom line intersects with the end surface is closer to the implement than the point where top line intersects with the end surface.

According to yet another aspect of the invention, a cutlery set includes various cutlery implements and a block having openings for receiving the implements. Each implement includes a marking located on a surface of the handle and positioned so that when the implement is sheathed in the block the marking is visible. The marking is preferably located on a butt end of the handle facing generally away from the block when the implement is sheathed in the block. The implement may also include a an exposed tang, fully forged with a knife blade and extending into the handle substantially the entire length of the handle and an ergonomic handle.

According to another aspect of the present invention, a cutlery implement comprises a knife. The knife includes a blade, a tang extending from the blade, and a bolster positioned between the tang and the blade. The knife includes a handle attached to the tang. The blade, bolster and tang are parts of a single piece of forged metal, and the tang includes a top surface facing in a direction generally opposite to a cutting surface of the blade, the top surface being visibly exposed along a top of the handle. The width of the handle adjacent the bolster is not greater than 3/5 the width of the handle at a midpoint along the length of the handle thereby providing a comfortable fit for a hand.

Preferably, the height of the handle adjacent the bolster is approximately 4/7 the height of the handle at a midpoint along the length of the handle.

The width of the handle adjacent the bolster is not greater than 3/5 the width of the handle at a midpoint along the length of the handle, thereby providing a comfortable fit when a hand properly grasps the knife so that the thumb and the forefinger extend over the bolster and blade on opposite sides of the knife and the three remaining fingers curl around the handle.

According to still another aspect of the present invention, a method of identifying cutlery is provided. The method includes: providing a plurality of cutlery implements, each having a working end and a handle; and placing an identifying marking on the handle of each piece of cutlery. Each piece of cutlery may be stored in a block of material so that the marking is exposed thereby allowing each piece of cutlery to be identified by the marking. The step of placing an identifying marking on the handle may include placing the marking on an end surface of the handle. The step of placing an identifying marking on the handle may include placing the marking on a substantially planar end surface of the handle facing generally away from the block.

It is to be understood that both the foregoing general description and the following detailed description are exemplary and explanatory only, and are not restrictive of the invention as claimed.

BRIEF DESCRIPTION OF THE DRAWINGS

These and other features, aspects and advantages of the present invention will become apparent from the following description, appended claims, and the accompanying exemplary embodiments shown in the drawings, which are briefly described below.

DETAILED DESCRIPTION

Embodiments of the present invention will be described below with reference to the accompanying drawings. It should be understood that the following description is intended to describe exemplary embodiments of the invention, and not to limit the invention.

Figure 1:
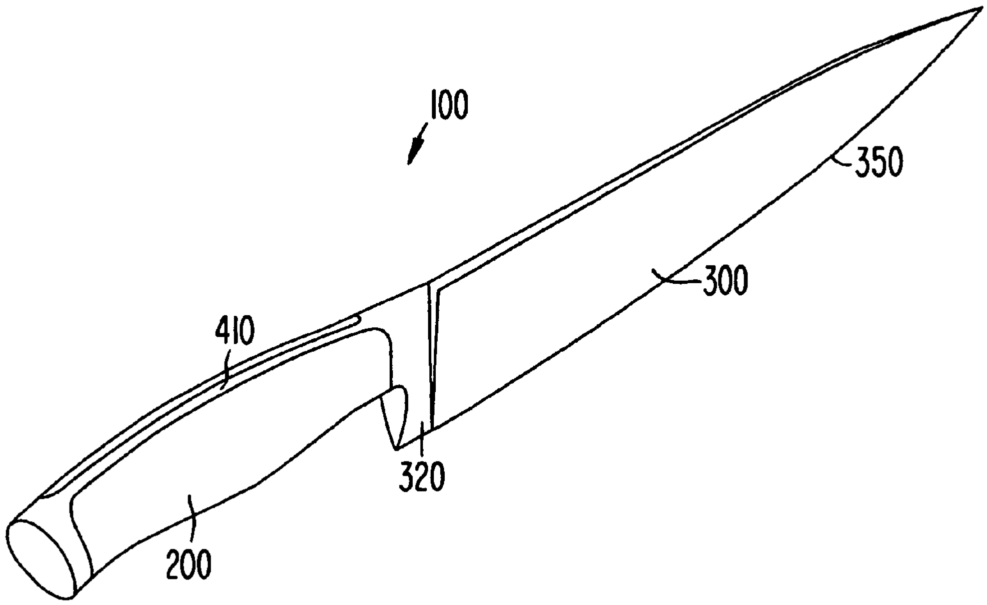
FIG. 1 is perspective view of a cutlery implement according to an embodiment of the present invention.

A cutlery implement 100 according to an embodiment of the invention shown in FIG. 1. The cutlery implement 100 includes a handle 200 and a working portion or element 300. As shown in FIG. 1, the implement 100 may be a knife. Alternatively, it could be a fork, sharpening steel, or other cutlery implement. The working element 300 in this example comprises a blade having a cutting surface 350. When referring to the drawings such as FIG. 3A, for example, the top of the knife 100 refers to the region of the knife opposite the cutting blade 350.

Figure 8:
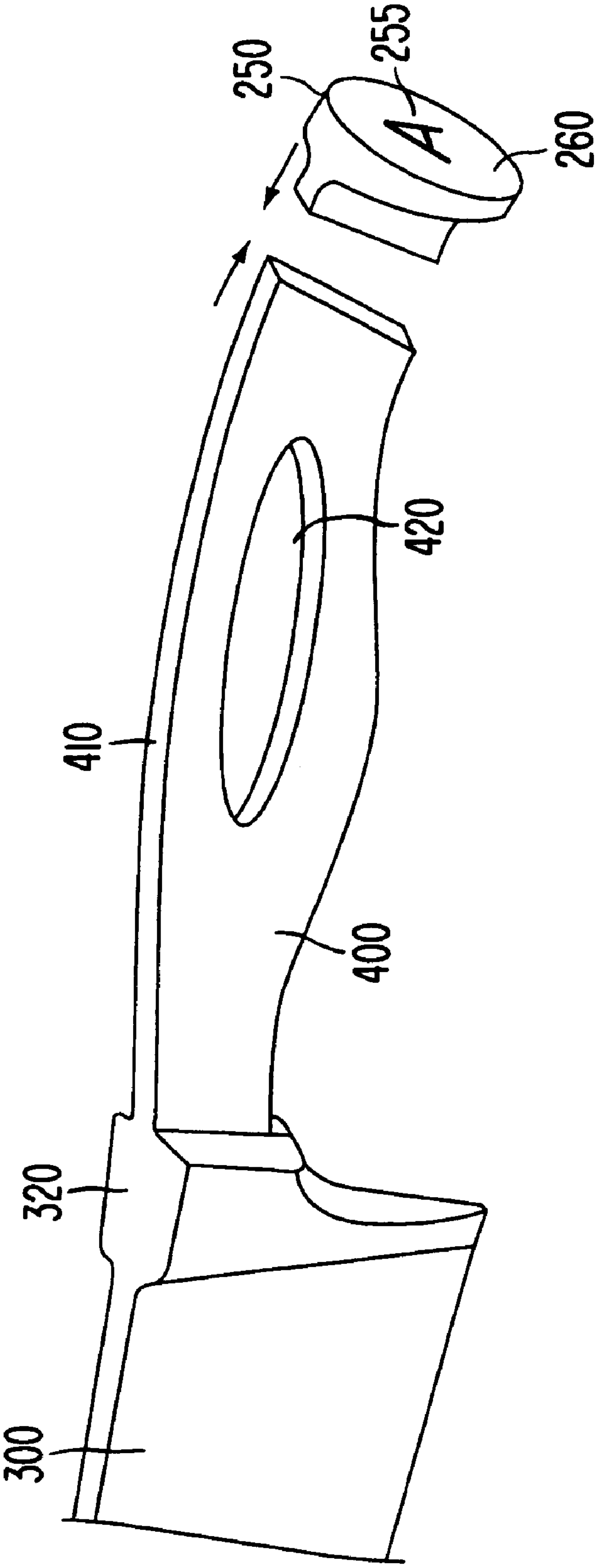
FIG. 8 is partial exploded perspective view of a cutlery implement according to an embodiment of the present invention shown without the handle covering and showing the end cap positioned away from the tang.

Located within the handle 200 and attached to the blade 300 is a tang 400 (not fully shown) that extends substantially along the entire length of the handle 200, thereby balancing the weight to the blade 300. The tang is illustrated as element 400 in FIG. 8. A bolster 320 is located between the tang 400 and the blade 300 (as also shown in FIG. 8). In this example, the working element or blade 300, the bolster 320 and the tang 400 are preferably formed from a single piece of forged metal, preferably steel. The fabrication of the working element 300, bolster 320 and tang 400 from a single piece of metal increases the durability and strength of the cutlery implement.

As shown in FIGS. 1 and 8, the tang 400 includes a top surface 410. The top surface 410 extends along the length of the handle 200 and is visible on the exterior of the knife 100. As a result, a user of the cutlery implement 100 is able to infer that the blade 300, tang 400 and bolster 320 are fully forged from a single piece of steel. Thus, the strength, durability and balance of the knife is readily apparent. While the exposed portion of the tang is shown in this example as running on the top surface of the implement, alternatively, the exposed portion of the tang 400 may be positioned along a bottom surface 220 of the handle 200.

As shown in FIG. 8, the tang 400 extends substantially throughout the height of the cross section of the knife 200. As shown in FIG. 8, the tang may optionally include a hole 420 in which material formed in the handle may be contained. Similar holes may be provided in other portions of the handle end.

The handle 200 may be formed in an injection molding process wherein the plastic material is injected into a mold surrounding the tang 400. The number and location of the holes 420 may be adjusted as necessary to provide for improved formation of the handle 200 and/or improved weight distribution and balance of the knife 100. Preferably, the blade 300, bolster 320 and tang 400 are formed by forging a heated iron bar. The blade 300 is then ground and serrated (if required). The handle 200 is then injected and the knife is polished.

Figure 2:
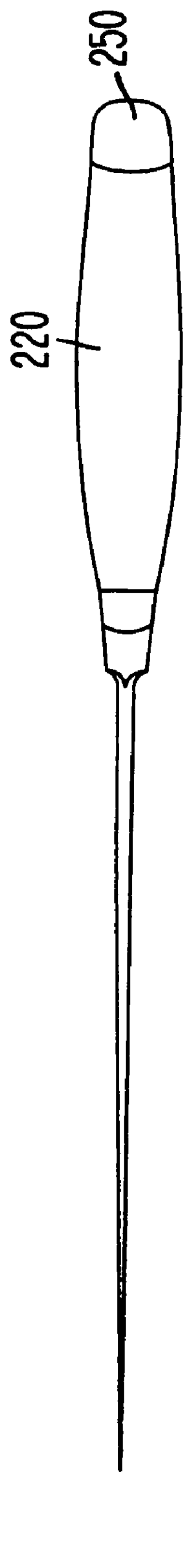
FIG. 2 is a bottom view of the cutlery implement of FIG. 1.

As shown in FIG. 8, an end cap 250 may be connected to the tang 400 in accordance with an aspect of the invention. In the example, the end cap is formed of metal such as steel, but other materials may be used. The tang 400 and the end cap 250 in this example are welded together, but may be joined in otherways. In the embodiment shown in FIG. 2, the end cap 250 may also be separate from the tang 400 and connected together by welding, for example. Alternatively, the end cap 250 may be constructed as part of the fully forged single piece blade 300, bolster 320 and tang 400.

Figure 6:
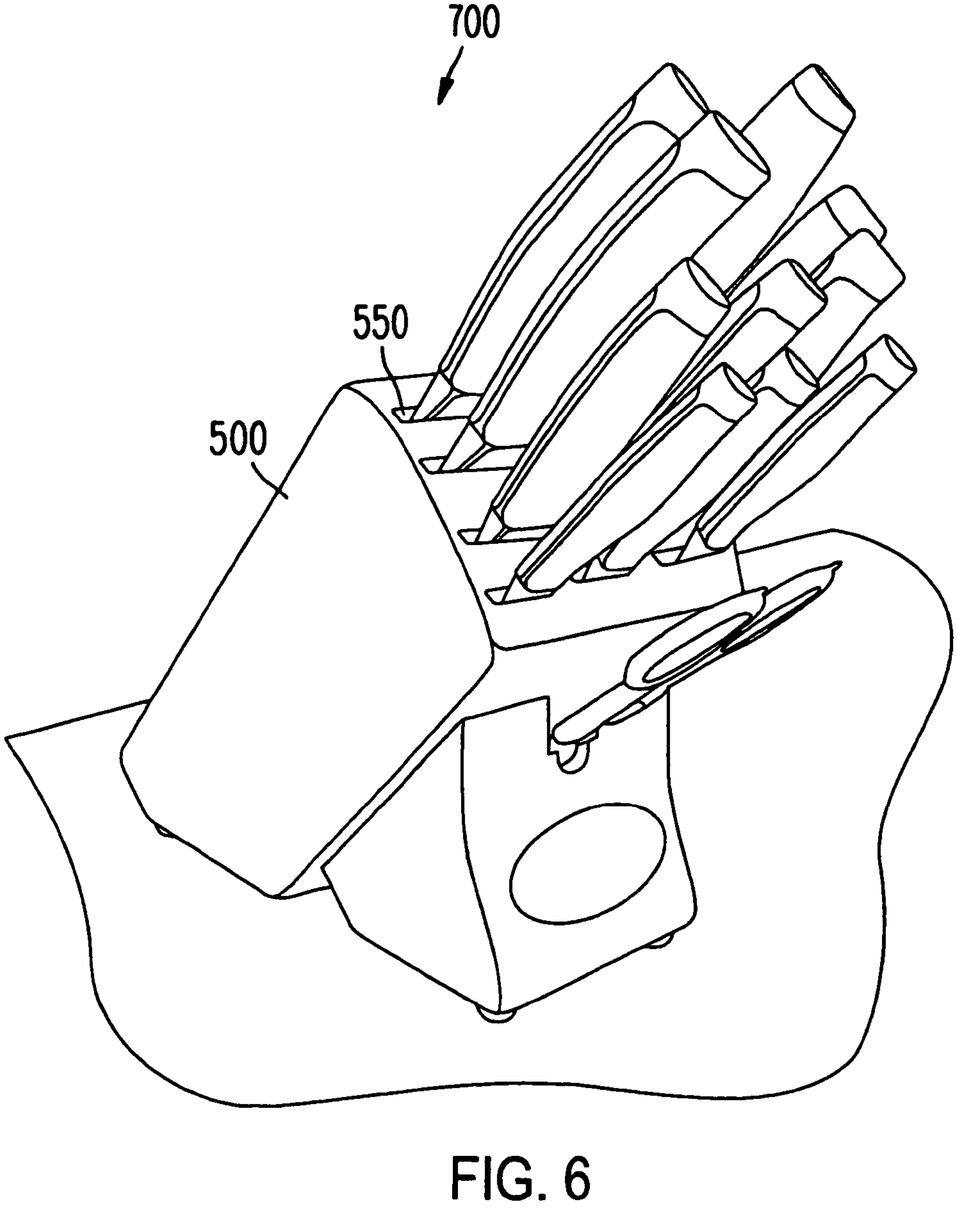
FIG. 6 is a perspective view of cutlery set including a plurality of cutlery implements and a block according to an embodiment of the present invention.
Figure 7:
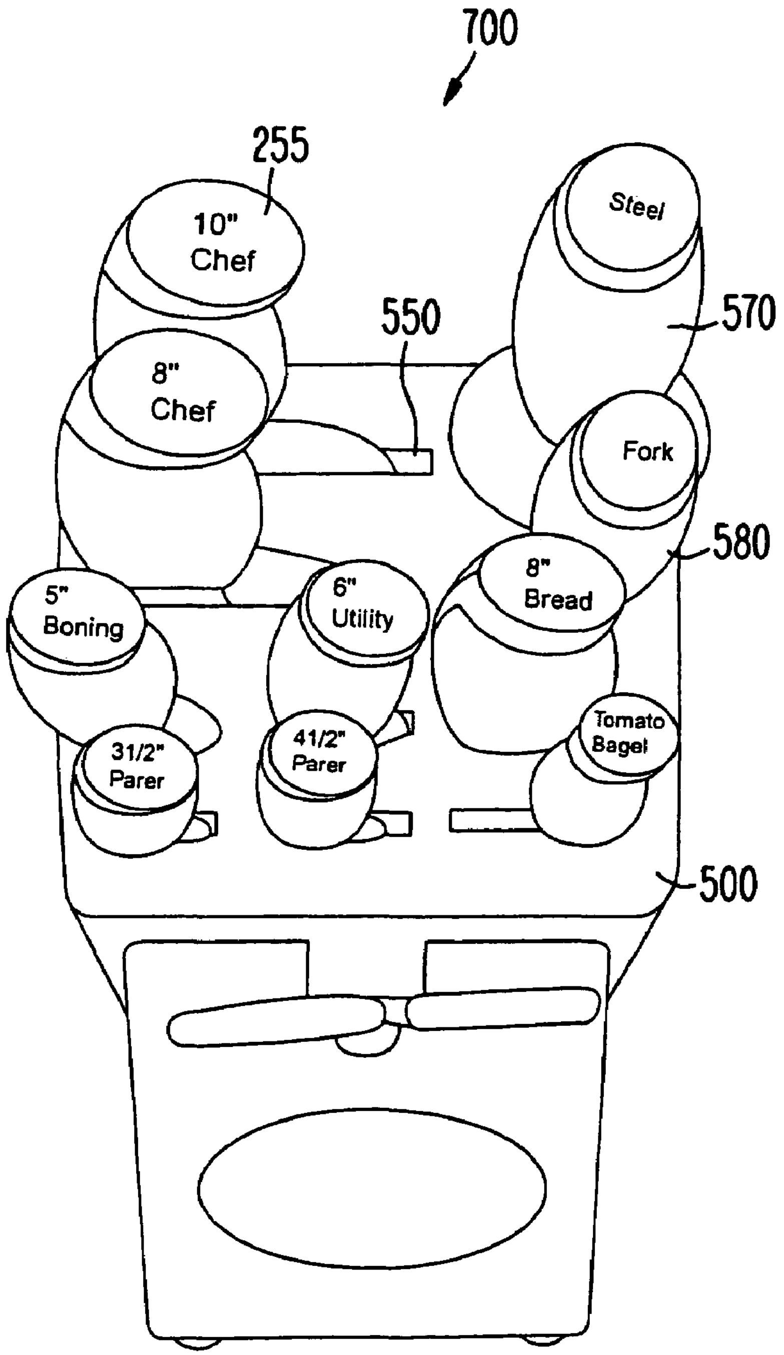
FIG. 7 is a top front view of the cutlery set of FIG. 6.

The cutlery implement 100 preferably includes a marking or insignia 255 identifying the cutlery element. As shown in FIG. 8, the insignia 255 is preferably positioned at the butt end of the handle 200. In a particularly preferred embodiment, the marking 255 is positioned on an end surface 260 of the end cap 250. The marking 255 is provided to identify and distinguish the cutlery implement when the working element 300 is sheath or stored and not in view. For example, as shown in FIG. 6, when the cutlery implement is provided as part of a set of implements 700, the implement 100 may be positioned in an opening 550 in a block 500. When used with the set 700, such as shown in FIG. 7, each cutlery implement may contain a distinguishing marking 255. The marking 255 is used to identify and distinguish between the sharpening steel 570 and the fork 580, for example. As mentioned above, the marking 255 is preferably positioned on the end of the handle so that when the cutlery implements are stored in the block 500 the marking is not obscured by adjacent implements.

The marking 255 allows the user to determine which knife or implement is located in the slot or opening 550 without pulling the implement 100 out of the block 500. As a result, less wear and tear is placed on the blade 300 of the knife or implement 100. The knife 100 only needs to be pulled out when needed, and not to determine whether it is the correct implement for the required task.

As shown in FIG. 7, for example, the marking 255 may comprise an alphanumeric marking that indicates the length or type of blade 300 attached to the handle. Alternatively, the marking 255 may indicate the type of food to be cut with the knife. The marking 255 may be made on the end cap 250 by etching, engraving, stamping or other suitable process.

According to another aspect to of the invention, the handle 200 is configured to provide a comfortable fit for the user. An experienced chef will typically hold a knife with the thumb and forefinger extending over the bolster 320 and blade 300. The remaining three fingers of the hand will wrap around the handle 200. Other less experienced users will typically place all five fingers around the handle 200. According to the embodiment of the present invention, the handle 200 is configured so that when held in either manner the knife 100 will be comfortable to the user.

Figure 3A:
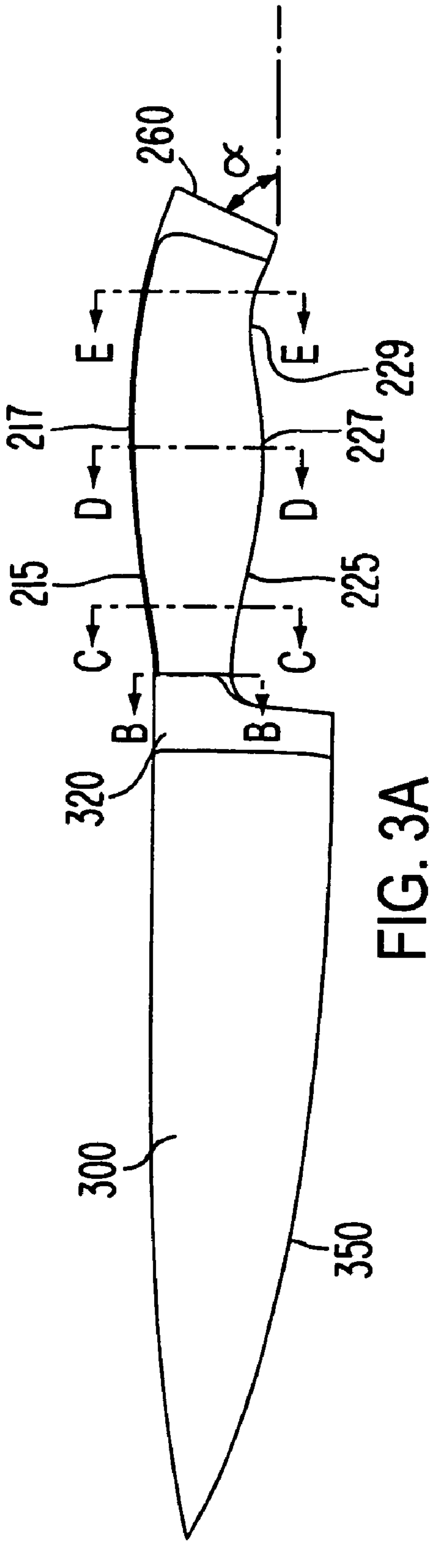
FIG. 3A is side view of the cutlery implement of FIG. 1.
Figure 3B:
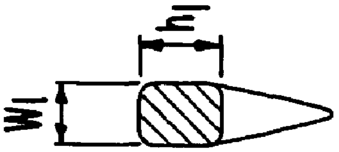
FIG. 3B is a cross-section view of the cutlery implement of FIG. 1 taken along lines B—B of FIG. 3A.
Figure 3C:
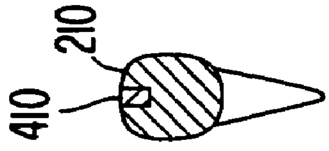
FIG. 3C is a cross-section view of the cutlery implement of FIG. 1 taken along lines C—C of FIG. 3A.
Figure 3D:
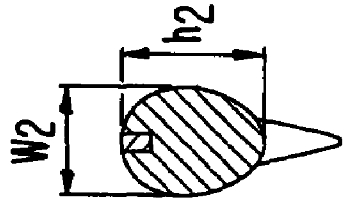
FIG. 3D is a cross-section view of the cutlery implement of FIG. 1 taken along lines D—D of FIG. 3A.

The cross-sectional area of the handle 200 is largest around its midpoint, as shown in FIG. 3D. The cross-sectional area is gradually reduced from the midpoint toward both ends of the handle. Similarly, the width and height of the handle 200 both decrease from the approximate midpoint, shown in FIG. 3D, to the ends of the handle.

A cross-sectional view of the handle at a point adjacent the bolster 320 is shown in FIG. 3B. The width $w_1$ of the handle adjacent the bolster 320 is preferably not greater than ⅗ of the width $w_2$ of the handle at its approximate midpoint. Similarly, the height $h_1$ of the handle adjacent the bolster 320 is selected to provide optimum comfort to the user and is preferably not greater than 4/7 the height $h_2$ of the handle at the approximate midpoint.

Figure 3E:
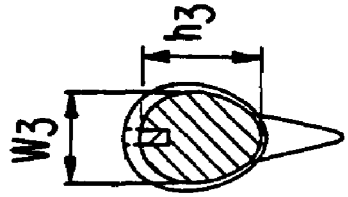
FIG. 3E is a cross-section view of the cutlery implement of FIG. 1 taken along lines E—E of FIG. 3A.
Figure 4:
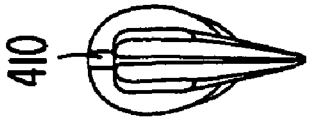
FIG. 4 is an end plan view of the cutlery implement of FIG. 1 taken from the blade end of the implement.
Figure 5:
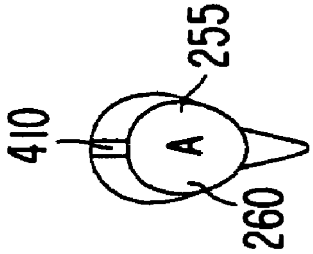
FIG. 5 is an end plan view of the cutlery implement of FIG. 1 taken from the handle end of the implement.

A cross-sectional view of the handle 200 adjacent the butt end is shown in FIG. 3E. Preferably, the cross-sectional area of the handle 200 adjacent the butt end is greater than the cross-sectional area of the handle 200 adjacent the bolster 320. This preferred arrangement can be readily observed by comparing FIG. 3E with FIG. 3B. Preferably, the handle 200 includes some tapering along its length from the approximate midpoint toward the butt end, however, the amount of tapering from the midpoint toward the butt end is less than the amount of tapering from the midpoint toward the bolster. Thus, the height $h_3$ of the handle 200 adjacent the butt end is less than the height $h_2$ of the handle 200 at the approximate midpoint. Similarly, the width $w_3$ of the handle adjacent the butt end is less than the width $w_2$ of the handle at the approximate midpoint shown in FIG. 3D.

The curvature of the handle 200 is preferably arranged to provide the user with a comfortable feel and fit. As shown in FIG. 3A, the handle 200 is curved so that a top line 215 extending along the top of the handle includes a single peak 217 and a bottom line 225 extending along the bottom of the handle is curved and includes a peak 227 and a single valley 229. The end surface 260 of the handle 200 is preferably configured as a planar surface. The surface 260 is preferably angled so that a line connecting the top line 215 and the bottom line 225 is angled so that the point where the bottom line 215 intersects with the end surface 260 is closer to the blade 300 than the point where top line 215 intersects with the end surface 260. As shown in FIG. 3A, the angle $\alpha$ of the surface 260 from the horizontal plane is preferably between 40 and 70 degrees, in order to provide optimum comfort and easy viewing of the marking 255.

The foregoing description illustrates various aspects features, and advantages of the invention. Among other features, the invention provides cutlery that may be more readily identified when sheathed in a block. It further provides cutlery having an ergonomic handle that is comfortable for both professional and non-professional users and for users with differently-sized hands. It does so while providing an exposed "full tang" that is indicative of the quality and characteristics of the implement.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. A cutlery set comprising:

a plurality of cutlery implements, including at least a first knife and a second knife, each of the first knife and said second knife having a working element comprising a blade and a handle to which the working element is attached, wherein the blade of the first knife differs from the blade of the second knife;

a block including a plurality of openings configured to receive the cutlery implements, the plurality of openings including at least a first opening configured to receive the blade of the first knife and a second opening configured to receive the blade of the second knife, so that when the first knife and the second knife are positioned, respectively, in the first opening and the second opening, the handle of the first knife and the handle of the second knife extend out of the block;

a first alphanumeric marking disposed on a butt end portion of the handle of the first knife so as to face generally away from the block when the blade of the first knife is sheathed in the first opening, the first marking indicating at least the type or length of the blade of the first knife; and a second alphanumeric marking disposed on a butt end portion of the handle of the second knife so as to face generally away from the block when the blade of the second knife is sheathed in the second opening, the second marking, differing from the first marking and indicating at least the type or length of the blade of the second knife.

2. The cutlery set according to claim 1, wherein the type of the first knife is selected from the group consisting of a chef knife, a boning knife, a bread knife, a utility knife, and a parer.

3. The cutlery set according to claim 1, wherein the first knife and the second knife each include a tang extending substantially along the length of the handle.

4. The cutlery set according to claim 3, wherein the handle is formed so that a top surface of the tang is exposed to view.

5. The cutlery set according to claim 3, wherein the tang and the blade of each of said first knife and second knife are formed from a single piece of forged metal.

6. The cutlery set according to claim 1, wherein the first marking is provided on a first end cap affixed to the butt end of the handle of the first knife and the second marking is provided on a second end cap affixed to the butt end of the handle of the second knife.

7. The cutlery set according to claim 1, wherein the first marking and the second marking are etched, engraved or stamped, onto the butt end portion of the handle.

8. The cutlery set according to claim 1, wherein each of the first knife and the second knife include a tang extending from the blade, to which the handle is attached, and a bolster positioned between the tang and the blade.

9. The cutlery set according to claim 8, wherein the blade, bolster and tang are parts of a single piece of forged metal.

10. The cutlery set according to claim 9, wherein the tang includes a top surface that is visibly exposed along a top of the handle.

11. The cutlery set according to claim 8, wherein the width of the handle adjacent the bolster is not greater than 3/5 the width of the handle at a midpoint along the length of the handle, thereby providing a comfortable fit for a hand.

12. The cutlery set according to claim 8, wherein the height of the handle adjacent the bolster is approximately 4/7 the height of the handle at a midpoint along the length of the handle.

13. The cutlery set according to claim 1, wherein the handle is configured so that a top line extending along the top of the handle includes a single peak and a bottom line extending along a bottom of the handle is curved and includes a single valley and an end surface of the handle is substantially planar and is angled so that a line connecting the top line and the bottom line is angled so that a point where the bottom line intersects with the end surface is closer to the blade than a point where top line intersects with the end surface.

14. The cutlery set according to claim 1, wherein the first marking and the second marking include numbering indicating, respectively, the length of the blade of the first knife and the length of the blade of the second knife.

15. A method for identifying different types of cutlery knives, comprising:

providing a set of cutlery knives, including at least a first knife and a second knife, each of the first knife and said second knife having a working element comprising a blade and a handle to which the working element is attached, wherein the blade of the first knife differs from the blade of the second knife;

providing a block including a plurality of openings configured to receive the cutlery implements, the plurality of openings including at least a first opening configured to receive the blade of the first knife and a second opening configured to receive the blade of the second knife, so that when the first knife and the second knife are positioned, respectively, in the first opening and the second opening, the handle of the first knife and the handle of the second knife extend out of the block;

providing a first alphanumeric marking on a butt end portion of the handle of the first knife so as to face generally away from the block when the blade of the first knife is sheathed in the first opening, the first marking indicating at least the type or length of the blade of the first knife; and providing a second alphanumeric marking disposed on a butt end portion of the handle of the second knife so as to face generally away from the block when the blade of the second knife is sheathed in the second opening, the second marking differing from the first marking and indicating at least the type or length of the blade of the second knife.

16. The method according to claim 15, wherein the type of the first knife is selected from the group consisting of a chef knife, a boning knife, a bread knife, a utility knife, and a parer.

17. The method according to claim 15, wherein the first knife and the second knife each include a tang extending substantially along the length of the handle.

18. The method according to claim 17, wherein the handle is formed so that a top surface of the tang is exposed to view.

19. The method according to claim 17, wherein the tang and blade of each of said first knife and second knife are formed from a single piece of forged metal.

20. The method according to claim 15, further comprising providing the first marking on a first end cap affixed to the butt end of the handle of the first knife and providing the second marking on a second end cap affixed to the butt end of the handle of the second knife.

21. The method according to claim 15, wherein providing the first marking and the second marking includes etching, engraving or stamping the first marking and the second marking, onto the butt end portion of the handle.

22. The method according to claim 15, wherein each of the first knife and the second knife include a tang extending from the blade, to which the handle is attached, and a bolster positioned between the tang and the blade.

23. The method according to claim 22, wherein the blade, bolster and tang are parts of a single piece of forged metal.

24. The method according to claim 23, wherein the tang includes a top surface that is visibly exposed along a top of the handle.

25. The method according to claim 22, wherein the width of the handle adjacent the bolster is not greater than 3/5 the width of the handle at a midpoint along the length of the handle, thereby providing a comfortable fit for a hand.

26. The method according to claim 22, wherein the height of the handle adjacent the bolster is approximately 4/7 the height of the handle at a midpoint along the length of the handle.

27. The method according to claim 15, wherein the handle is configured so that a top line extending along the top of the handle includes a single peak and a bottom line extending along a bottom of the handle is curved and includes a single valley and an end surface of the handle is substantially planar and is angled so that a line connecting the top line and the bottom line is angled so that a point where the bottom line intersects with the end surface is closer to the blade than a point where top line intersects with the end surface.

28. The method according to claim 15, wherein the first marking and the second marking include numbering indicating, respectively, the length of the blade of the first knife and the length of the second knife.

* * * * *